US012236833B2

(12) United States Patent
Liu et al.

(10) Patent No.: US 12,236,833 B2
(45) Date of Patent: Feb. 25, 2025

(54) DISPLAY PANEL FOR DETERMINING FLICKER DEGREE BASED ON BRIGHTNESS DATA AND DEBUGGING METHOD THEREOF

(71) Applicant: HEFEI VISIONOX TECHNOLOGY CO., LTD., Anhui (CN)

(72) Inventors: Tonghai Liu, Hefei (CN); Zhenkun Yu, Hefei (CN)

(73) Assignee: HEFEI VISIONOX TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 18/472,317

(22) Filed: Sep. 22, 2023

(65) Prior Publication Data

US 2024/0046838 A1 Feb. 8, 2024

Related U.S. Application Data

(63) Continuation of application No. PCT/CN2022/088193, filed on Apr. 21, 2022.

(30) Foreign Application Priority Data

Sep. 3, 2021 (CN) ........................ 202111033241.2

(51) Int. Cl.
*G09G 3/20* (2006.01)
*G09G 3/32* (2016.01)

(52) U.S. Cl.
CPC ............. *G09G 3/2007* (2013.01); *G09G 3/32* (2013.01); *G09G 2300/0819* (2013.01);
(Continued)

(58) Field of Classification Search
CPC .................................................... G09G 3/2007
(Continued)

(56) References Cited

U.S. PATENT DOCUMENTS

2017/0295310 A1* 10/2017 Yamashita ........... H04N 23/745
2020/0221028 A1* 7/2020 Kobayashi ........... H04N 23/745

FOREIGN PATENT DOCUMENTS

CN 1519560 A 8/2004
CN 101650481 A 2/2010
(Continued)

OTHER PUBLICATIONS

International Search Report issued on Jul. 4, 2022, in corresponding International Application No. PCT/CN2022/088193, 6 pages.
(Continued)

*Primary Examiner* — Long D Pham
(74) *Attorney, Agent, or Firm* — Maier & Maier, PLLC

(57) ABSTRACT

A flicker debugging method and device for a display panel. The flicker debugging method for a display panel includes acquiring multiple display brightness data of the display panel in a preset time period; processing the multiple display brightness data to obtain a time-domain signal of the multiple display brightness data that is continuous in a time domain; determining the flicker degree parameter of the display panel according to the change rates of the display brightness data in multiple first time periods in the time-domain signal of the multiple display brightness data, where the duration of each first time period is determined according to the visual persistence time of a human eye, and the duration of the preset time period is greater than the duration of each first time period; and determining whether to debug the display panel according to the flicker degree parameter.

19 Claims, 8 Drawing Sheets

(52) U.S. Cl.
CPC ............... *G09G 2320/0247* (2013.01); *G09G 2320/0626* (2013.01); *G09G 2340/0435* (2013.01); *G09G 2354/00* (2013.01); *G09G 2360/16* (2013.01)

(58) Field of Classification Search
USPC .......................................................... 345/690
See application file for complete search history.

(56) References Cited

FOREIGN PATENT DOCUMENTS

| | | | |
|---|---|---|---|
| CN | 103135074 | A | 6/2013 |
| CN | 103267627 | A | 8/2013 |
| CN | 104952419 | B | 12/2017 |
| CN | 107945733 | A | 4/2018 |
| CN | 109524422 | A | 3/2019 |
| CN | 110942738 | A | 3/2020 |
| CN | 111025698 | A | 4/2020 |
| CN | 113707072 | A | 11/2021 |
| CN | 114038416 | A | 2/2022 |
| CN | 114323594 | A | 4/2022 |
| JP | 2003254860 | A | 9/2003 |
| JP | 2008292904 | A | 12/2008 |
| KR | 20130110388 | A | 10/2013 |

OTHER PUBLICATIONS

Office Action issued on Jul. 18, 2022, in related Chinese Patent Application No. 202111033241.2, 20 pages.
Office Action issued on Oct. 11, 2022, in related Chinese Patent Application No. 202111033241.2, 10 pages.

* cited by examiner

DISPLAY PANEL FOR DETERMINING FLICKER DEGREE BASED ON BRIGHTNESS DATA AND DEBUGGING METHOD THEREOF

CROSS-REFERENCE TO RELATED APPLICATION

This is a continuation of International Patent Application NO. PCT/CN2022/088193, filed on Apr. 21, 2022, which claims priority to Chinese Patent Application No. 202111033241.2 filed with the China National Intellectual Property Administration (CNIPA) on Sep. 3, 2021, the disclosure of which is incorporated herein by reference in its entirety.

TECHNICAL FIELD

The present disclosure relates to the field of display technology, for example, a flicker debugging method and device for a display panel.

BACKGROUND

With the development of display technology, people have increasingly higher requirements for the performance of display panels. When a display panel displays at different refresh rates, a display screen has a flicker phenomenon of different degrees. In the related art, the accuracy of the test for the flicker degree of a display panel is low, which is not conducive to the alleviation of a flicker phenomenon.

SUMMARY

The present disclosure provides a flicker debugging method and device for a display panel to improve the accuracy of a flicker degree parameter and improve the alleviation effect of the flicker phenomenon of the display panel.

The present disclosure provides a flicker debugging method for a display panel. The method includes the following steps. Multiple display brightness data of the display panel in a preset time period is acquired. The multiple display brightness data is processed to obtain a time-domain signal of the multiple display brightness data that is continuous in a time domain. The flicker degree parameter of the display panel is determined according to the change rates of the display brightness data in multiple first time periods in the time-domain signal of the multiple display brightness data. The duration of each first time period is determined according to the visual persistence time of a human eye. The duration of the preset time period is greater than the duration of each first time period. Whether to debug the display panel is determined according to the flicker degree parameter.

The present disclosure provides a flicker debugging device for a display panel. The device includes a display brightness data acquisition module, a display brightness data processing module, a flicker degree parameter determination module, and a debugging module. The display brightness data acquisition module is configured to acquire the multiple display brightness data of the display panel in the preset time period. The display brightness data processing module is configured to process the multiple display brightness data to obtain the time-domain signal of the multiple display brightness data that is continuous in the time domain. The flicker degree parameter determination module is configured to determine the flicker degree parameter of the display panel according to the change rates of the display brightness data in the multiple first time periods in the time-domain signal of the multiple display brightness data. The duration of each first time period is determined according to the visual persistence time of the human eye. The duration of the preset time period is greater than the duration of each first time period. The debugging module is configured to determine whether to debug the display panel according to the flicker degree parameter.

The flicker phenomenon of the display panel is related to the brightness difference when a display screen is switched, the switching time limit of the display screen recognizable by the human eye, and the relative degree of the change of display brightness. In the flicker debugging method and device for a display panel provided in the embodiments of the present disclosure, display brightness data is processed to obtain the time-domain signal of the multiple display brightness data that is continuous in the time domain, which facilitates reducing the difficulty of data processing. The flicker degree parameter of the display panel is determined according to the change rates of the display brightness data in the multiple first time periods in the time-domain signal of the multiple display brightness data, so that it is achieved that the flicker degree parameter is determined according to the change in display brightness in the visual persistence time. Thus, the accuracy of the flicker degree parameter is improved. In the embodiments of the present disclosure, the flicker degree parameter is determined according to the combination of the causes of the preceding flicker phenomenon so that the flicker degree parameter is closer to the observation effect of the human eye. Thus, the accuracy of the flicker degree parameter is improved. The display panel is debugged according to the flicker degree parameter, which also facilitates improving the alleviation effect of the flicker phenomenon.

DETAILED DESCRIPTION

Figure 1:
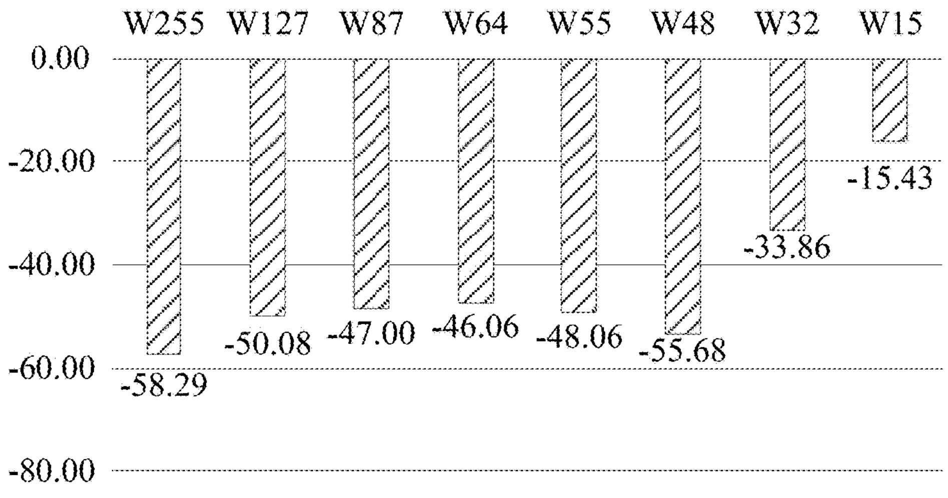
FIG. 1 is a diagram of a flicker degree test result.

The present disclosure is described below in conjunction with drawings and embodiments. It is to be understood that the embodiments set forth below are merely intended to illustrate and not to limit the present disclosure. Additionally, it is to be noted that for ease of description, only part of structures related to the present disclosure are illustrated in the drawings.

Generally, the accuracy of the test for the flicker degree of a display panel is low, which is not conducive to the alleviation of a flicker phenomenon. The reasons for the preceding problems are as follows. The display panel can implement free switching of different refresh rates. For example, in a display panel based on low temperature polycrystalline oxide (LTPO) technology, a low-temperature polycrystalline silicon (LTPS) transistor and an indium gallium zinc oxide (IGZO) transistor are applied to a pixel circuit to drive the display panel to display at different refresh rates. For example, in a video mode and a game mode, the display panel may be switched to a refresh rate of 120 Hz. In a standby state, a screen off state, and a reading state, the display panel may be switched to a refresh rate of 10 Hz or even 1 Hz. When the refresh rate of the display panel is low, since the switching time of a display screen is prolonged, which exceeds the response time of a human eye, the brightness change during each display screen writing may be recognized by the human eye, and as a result, a user can observe the flicker of the display screen.

To alleviate the flicker phenomenon of the display panel, a quantitative test needs to be performed on the flicker degree of the display panel. There are generally two solutions below for testing the flicker degree.

In solution one, the flicker degree of the display panel is determined through visual inspection by the human eye. The efficiency of this solution is low, and it is difficult to accurately quantify the flicker degree of the display panel.

In solution two, a frequency-domain signal of display brightness data is acquired, and the flicker degree of the display panel is calculated according to the amplitude of the frequency-domain signal of the display brightness data. In this solution, the flicker degree obtained at a low refresh rate does not match the flicker degree through visual inspection, resulting in low test accuracy of the flicker degree.

For example, FIG. 1 is a diagram of a flicker degree test result, which may be obtained by using the Solution two to test the display panel at a refresh rate of 10 Hz. The abscissa denotes a grayscale. For example, W255 is 255 grayscale, W127 is 127 grayscale, W87 is 87 grayscale, W64 is 64 grayscale, W55 is 55 grayscale, W48 is 48 grayscale, W32 is 32 grayscale, and W15 is 15 grayscale. The ordinate denotes the flicker degree. The smaller the value of the flicker degree is, the slighter the flicker degree is. The greater the value of the flicker degree is, the more severe the flicker degree is. As shown in FIG. 1, the test result showed that the flicker degree in 48 grayscale is slighter than the flicker degree in 64 grayscale and the flicker degree in 55 grayscale. However, according to the theory and the visual result of the human eye, it is known that the flicker degree in 48 grayscale should be more severe than the flicker degree in 64 grayscale and the flicker degree in 55 grayscale. The test result does not match the theory and the visual result of the human eye. As a result, there is a problem that the test accuracy is low, and it is not conducive to the alleviation of the flicker phenomenon.

Figure 2:
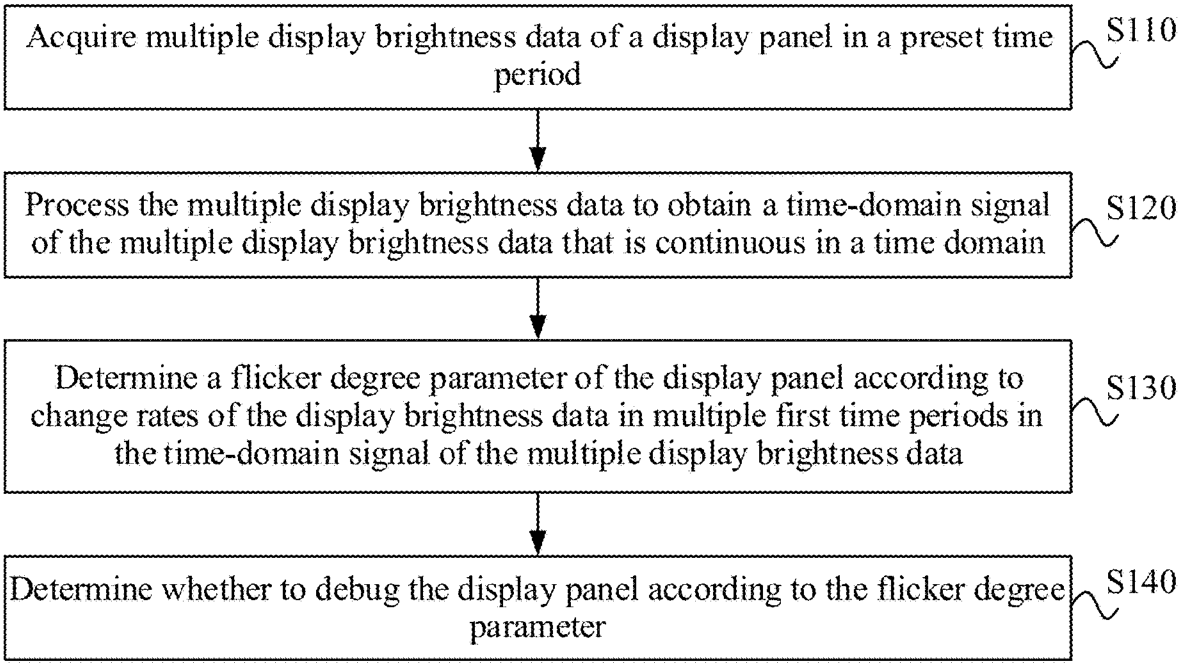
FIG. 2 is a flowchart of a flicker debugging method for a display panel according to an embodiment of the present disclosure.

In view of the preceding problem of inaccurate quantitative testing of the flicker degree of the display panel, an embodiment of the present disclosure provides a flicker debugging method for a display panel. The method is used to determine the flicker degree parameter of the display panel, which facilitates the alleviation of the flicker phenomenon. The method may be performed by a flicker debugging device for a display panel. FIG. 2 is a flowchart of a flicker debugging method for a display panel according to an embodiment of the present disclosure. As shown in FIG. 2, the method includes the steps below.

In S110, multiple display brightness data of the display panel in a preset time period is acquired.

The display panel may be a light-emitting diode (LED) display panel, an organic light-emitting diode (OLED) display panel, a micro light-emitting diode (micro LED) display panel, or the like. The display panel is controlled to display to acquire the display brightness data of the display panel in the preset time period. For example, the display panel may be controlled to display in a target grayscale at a preset refresh rate, and the display brightness data in the preset time period is acquired.

In S120, the multiple display brightness data is processed to obtain a time-domain signal of the multiple display brightness data that is continuous in a time domain.

For example, acquisition of the multiple display brightness data in the preset time period is acquisition of the time-domain signal of the display brightness data in the preset time period, that is, acquisition of the time-domain signal of the multiple display brightness data at different times in the preset time period. The multiple display brightness data is processed in the following manners: the multiple display brightness data in the time domain may be first converted into display brightness data in a frequency domain (i.e., frequency-domain signal of display brightness data at different frequencies), and then the display brightness data in the frequency domain is converted into the display brightness data in the time domain to obtain the converted time-domain signal of the multiple display brightness data at different times in the preset time period. In this manner, the cluttered original display brightness data is converted into display brightness data that is stable and continuous in the time domain, thereby reducing the difficulty of subsequent data processing.

In S130, the flicker degree parameter of the display panel is determined according to the change rates of the display brightness data in multiple first time periods in the time-domain signal of the multiple display brightness data.

The change rate of the display brightness data indicates the speed at which the display brightness data changes. To determine the change rate of the display brightness data, it is necessary to determine not only the change value of the display brightness data, but also the duration of the change of the display brightness data. A first time period is the duration for determining the speed at which the brightness data changes. The duration of the first time period is determined according to the visual persistence time of the human eye. The duration of the preset time period is greater than the duration of the first time period.

Visual persistence refers to the phenomenon that the vision arousing from the effect of light on retina remains for some time after light stops its effect. The refresh rate of the display panel determines the switching time of a display screen. When the switching time of the display screen is equal to the visual persistence time, the switching time may be considered as a critical value that the human eye cannot recognize the flicker phenomenon. When the switching time of the display screen is less than or equal to the visual persistence time, the change of display brightness when the display screen is switched cannot be recognized by the human eye. When the switching time of the display screen is greater than the visual persistence time, recognize the change of the display brightness when the display screen is switched can be recognized by the human eye. The visual persistence time of the human eye is determined as the duration of the first time period, which facilitates the determination of the flicker degree parameter of the display panel according to the recognition limit of the human eye for the flicker phenomenon, so that the evaluation of the flicker degree is closer to the actual observation effect of the human eye.

The time-domain signal of the multiple display brightness data subjected to the processing include display brightness data at different times in the preset time period. The display brightness data in each first time period in the time-domain signal of the multiple display brightness data may be display brightness data in a first time period starting from any time in the preset time period. The multiple display brightness data in the preset time period may include display brightness data in multiple first time periods. For example, when the duration of the preset time period is 2 seconds and the duration of the first time period is 41.6 milliseconds, the display brightness data in the multiple first time periods may include display brightness data in 41.6 milliseconds from 0.1 seconds, display brightness data in 41.6 milliseconds from 0.11 seconds, and display brightness data in 41.6 milliseconds from 0.12 seconds. No more examples are given. The duration of the preset time period should be as long as possible to acquire as much display brightness data as possible in the first time period, thereby improving the accuracy of the flicker degree parameter.

The change rates of the display brightness data in multiple first time periods can reflect the change degree of the display brightness in the time period. For example, in an embodiment of the present disclosure, the maximum value of the change rates of the multiple display brightness data may be determined according to the change rates of the display brightness data in multiple first time periods in the preset time period, and the maximum value is determined as the flicker degree parameter of the display panel to represent the flicker degree of the display panel when the display panel displays in the target grayscale at the preset refresh rate. In another embodiment of the present disclosure, the average value of the change rates may be calculated according to the change rates of the multiple display brightness data, and the average value is determined as the flicker degree parameter of the display panel to represent the flicker degree of the display panel when the display panel displays in the target grayscale at the preset refresh rate. In other embodiments of the present disclosure, the flicker degree parameter may be calculated in another method according to the change rates of the display brightness data in the multiple first time periods. For example, weights are set for the change rates of the display brightness data in the multiple first time periods, and the flicker degree parameter is calculated in a weighted averaging manner. This is not limited in embodiments of the present disclosure.

In S140, whether to debug the display panel is determined according to the flicker degree parameter.

For example, the greater the flicker degree parameter is, the greater the change degree of the display brightness of the display screen in a first time period is, and the more severe the flicker phenomenon is. The smaller the flicker degree parameter is, the smaller the change degree of the display brightness of the display screen in the first time period is, and the slighter the flicker phenomenon is. A critical threshold value of the flicker degree when the display panel displays in the target grayscale at the preset refresh rate may be set. When the flicker degree parameter in the target grayscale is greater than the critical threshold value, it is determined that the current flicker degree is unacceptable, and the display panel needs to be debugged to alleviate the flicker degree of the display panel. When the flicker degree parameter of the target grayscale is less than or equal to the critical threshold value, it is determined that the current flicker degree is acceptable, and the display panel does not need to be debugged.

The display panel may be debugged in a variety of methods to alleviate the flicker degree of the display panel. Several of the methods are described schematically below.

In a first flicker alleviation method, when the flicker degree of the display panel is unacceptable, the drive timing of a pixel circuit is adjusted. For example, the data write time of a frame of display screen is prolonged, so that a data voltage is sufficiently written into a storage capacitor. In this manner, the storage capacitor can better maintain the voltage of the gate of a drive transistor in a light emission stage, thereby alleviating the display screen flicker caused by the excessive switching time of an adjacent frame of display screen. Alternatively, a compensation stage or a precharging stage is added to the drive timing of the pixel circuit to precharge the storage capacitor before a data write stage, which also facilitates improving the maintenance effect of the storage capacitor on the voltage at the gate of the drive transistor, thereby alleviating the flicker phenomenon.

In a second flicker alleviation method, when the flicker degree of the display panel is unacceptable, the voltage value of an initialization signal is adjusted. The initialization signal refers to a signal for initializing the gate of the drive transistor. The voltage value of the initialization signal is adjusted so that the voltage difference between the gate of the drive transistor and an initialization signal input terminal can be adjusted, thereby reducing the leakage current between the gate of the drive transistor and the initialization signal input terminal in the light emission stage. In this manner, when the switching time of an adjacent frame of display screen is excessive, the flicker phenomenon caused by the discharge of the gate charge of the drive transistor through a leakage path is avoided.

In a third flicker alleviation method, when the flicker degree of the display panel is unacceptable, a power voltage is adjusted. The power voltage may be a power voltage (for example, ELVDD) electrically connected to the anode of a light emission device in the light emission stage. The magnitude of the power voltage is related to the magnitude of the display brightness. The power voltage is adjusted so that the overall display brightness of the display panel can be adjusted. When the overall display brightness changes, the change rate of the display brightness also changes. Thus, the magnitude of the power voltage may be adjusted to reduce the change rate of the display brightness. In this manner, when the switching time of an adjacent frame of display screen is excessive, the change of the display brightness is reduced, thereby alleviating the flicker phenomenon.

The flicker phenomenon of the display panel is related to the brightness difference when a display screen is switched, the switching time limit of the display screen recognizable by the human eye, and the relative degree of the change of display brightness. In the technical solutions of this embodiment of the present disclosure, the multiple display brightness data is processed to obtain the time-domain signal of the multiple display brightness data that is continuous in the time domain, which facilitates reducing the difficulty of data processing. The flicker degree parameter of the display panel is determined according to the change rates of the display brightness data in the multiple first time periods in the time-domain signal of the multiple display brightness data, so that it is achieved that the flicker degree parameter is determined according to the change of display brightness in the visual persistence time. Thus, the accuracy of the flicker degree parameter is improved. In this solution, the flicker degree parameter is determined according to the combination of the causes of the preceding flicker phenomenon, so that the flicker degree parameter is closer to the observation effect of the human eye. Thus, the accuracy of the flicker degree parameter is improved, and the display panel is debugged according to the flicker degree parameter in this embodiment of the present disclosure. Moreover, it is beneficial to improve the alleviation effect of the flicker phenomenon.

Figure 3:
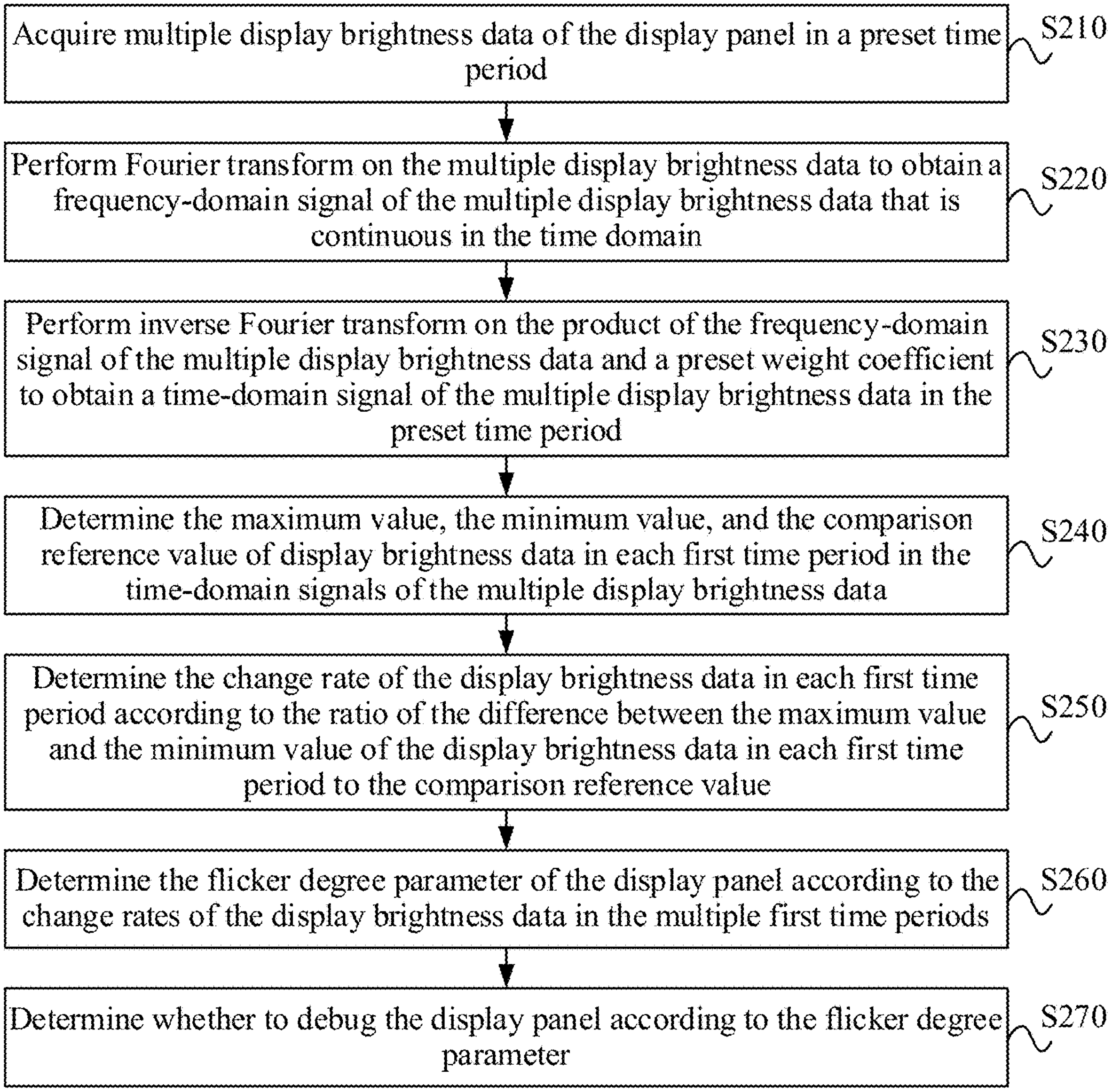
FIG. 3 is a flowchart of another flicker debugging method for a display panel according to an embodiment of the present disclosure.

FIG. 3 is a flowchart of another flicker debugging method for a display panel according to an embodiment of the present disclosure. On the basis of the preceding embodiment, the flicker debugging method for a display panel is described in this embodiment. As shown in FIG. 3, the method includes the steps below.

In S210, multiple display brightness data of the display panel in a preset time period is acquired.

For example, the display panel is controlled by a pattern generator (PG) to display in a target grayscale at a refresh rate of 10 Hz, and the display brightness data of the display panel in the preset time period is acquired by a colorimeter. For example, the data acquisition frequency of the colorimeter is 3000 Hz, the quantity of acquired data is 8192, and the duration of the preset time period is 2.73 seconds. In the case where data in the first 0.1 seconds and data of the last 0.1 seconds are removed, display brightness data of 25 frames can be acquired at the refresh rate of 10 Hz.

In S220, Fourier transform is performed on the multiple display brightness data to obtain a frequency-domain signal of the multiple display brightness data.

Acquisition of the multiple display brightness data in the preset time period is acquisition of time-domain signal of the multiple display brightness data in the preset time period. The time-domain signal is continuous data. Fourier transform is performed on the multiple display brightness data so that the multiple display brightness data in the time domain can be represented as multiple display brightness data in the frequency domain, thereby obtaining frequency-domain signal of the multiple display brightness data. The frequency-domain signal are discrete data.

In S230, inverse Fourier transform is performed on the product of the frequency-domain signal of the multiple display brightness data and a preset weight coefficient to obtain the time-domain signal of the multiple display brightness data in the preset time period.

The preset weight coefficient is a coefficient of display brightness data. The preset weight coefficient may be set according to requirements to obtain display brightness data in a requirement range. Optionally, the preset weight coefficient may be a sensitivity coefficient of the human eye to the flicker. The sensitivity coefficient can reflect the sensitivity degree of the human eye to the flicker of a display screen. For example, the sensitivity coefficient may be a coefficient ranging from 0 to 2. Sensitivity coefficients corresponding to different refresh rate ranges are different.

Table 1 is a data table of refresh rates and sensitivity coefficients. Table 1 schematically shows sensitivity coefficients corresponding to refresh rates of 20 Hz, 30 Hz, 40 Hz, 50 Hz, 60 Hz, and greater than 60 Hz. For example, in an embodiment of the present disclosure, the sensitivity coefficients shown in Table 1 may be used. It can be seen from Table 1 that the sensitivity degree of the human eye to the flicker of the display screen corresponding to a different refresh rate range is different. For the refresh rates of 20 Hz to 60 Hz and above in this embodiment, the value of the sensitivity coefficient may be taken in the range of 0 to 1. The higher the refresh rate is, the smaller the sensitivity coefficient is.

TABLE 1

| Refresh rate (Hz) | Sensitivity Coefficient |
|---|---|
| 20 | 1.00 |
| 30 | 0.708 |
| 40 | 0.501 |
| 50 | 0.251 |
| ≥60 | 0.010 |

Figure 4:
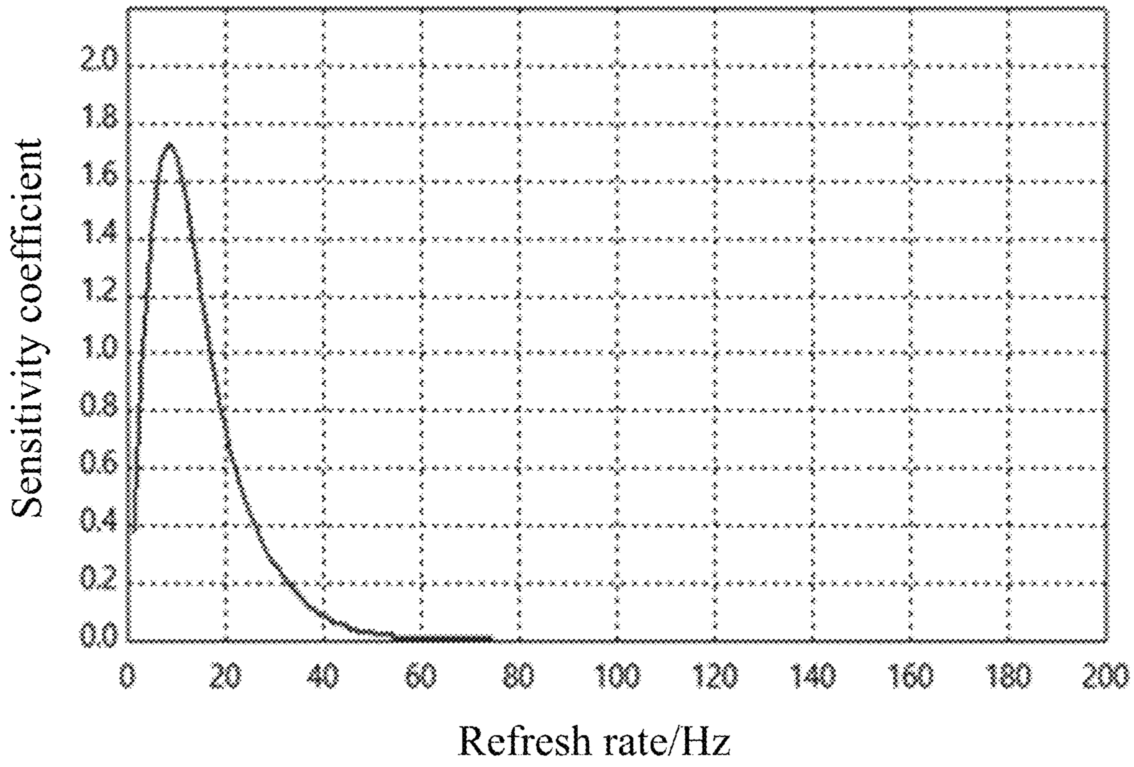
FIG. 4 is a graph showing the relationship between a refresh rate and a sensitivity coefficient according to an embodiment of the present disclosure.

Table 2 is another data table of refresh rates and sensitivity coefficients. Table 2 schematically shows sensitivity coefficients corresponding to multiple refresh rates in the refresh rates of 1 Hz to 75 Hz. FIG. 4 is a graph showing the relationship between a refresh rate and a sensitivity coefficient according to an embodiment of the present disclosure, and may be a graph showing the relationship between a refresh rate and a sensitivity coefficient in Table 2. For example, in another embodiment of the present disclosure, the sensitivity coefficients shown in Table 2 and FIG. 4 may be used. It can be seen from Table 2 and FIG. 4 that the sensitivity degree of the human eye to the flicker of the display screen corresponding to a different refresh rate range among the refresh rates of 1 Hz to 75 Hz is different. For the refresh rates of 1 Hz to 75 Hz in this embodiment, the value of the sensitivity coefficient may be taken in the range of 0 to 2.

During the application, a sensitivity coefficient may be determined according to the refresh rate corresponding to display brightness data. For example, the sensitivity coefficients corresponding to different refresh rates are determined according to Table 1, or the sensitivity coefficients corresponding to different refresh rates may be determined according to Table 2 and FIG. 4. The frequency-domain signal of display brightness data is multiplied by a sensitivity coefficient so that the time-domain signal of the display brightness data considering the sensitivity coefficient of the human eye to a flicker can be obtained, which facilitates making the processed display brightness data closer to the actual effect of observing a display screen by the human eye, thereby improving the accuracy of subsequent data processing.

TABLE 2

| Refresh rate (Hz) | Sensitivity Coefficient |
|---|---|
| 1 | 0.38 |
| 2 | 0.68 |
| 3 | 0.97 |

TABLE 2-continued

| Refresh rate (Hz) | Sensitivity Coefficient |
|---|---|
| 4 | 1.22 |
| 5 | 1.42 |
| 6 | 1.58 |
| 7 | 1.67 |
| 8 | 1.72 |
| 9 | 1.73 |
| 10 | 1.69 |
| 11 | 1.63 |
| 12 | 1.54 |
| 13 | 1.44 |
| 14 | 1.33 |
| 15 | 1.22 |
| 16 | 1.11 |
| 17 | 1.00 |
| 18 | 0.91 |
| 19 | 0.82 |
| 20 | 0.74 |
| 21 | 0.67 |
| 22 | 0.60 |
| 23 | 0.55 |
| 24 | 0.49 |
| 25 | 0.45 |
| 26 | 0.41 |
| 27 | 0.37 |
| 28 | 0.33 |
| 29 | 0.30 |
| 30 | 0.27 |
| 31 | 0.25 |
| 32 | 0.22 |
| 33 | 0.20 |
| 34 | 0.18 |
| 35 | 0.16 |
| 36 | 0.14 |
| 37 | 0.13 |
| 38 | 0.11 |
| 39 | 0.10 |
| 40 | 0.09 |
| 41 | 0.08 |
| 42 | 0.07 |
| 43 | 0.06 |
| 44 | 0.06 |
| 45 | 0.05 |
| 46 | 0.04 |
| 47 | 0.04 |
| 48 | 0.03 |
| 49 | 0.03 |
| 50 | 0.03 |
| 51 | 0.02 |
| 52 | 0.02 |
| 53 | 0.02 |
| 54 | 0.02 |
| 55 | 0.01 |
| 56 | 0.01 |
| 57 | 0.01 |
| 58 | 0.01 |
| 59 | 0.01 |
| 60 | 0.01 |
| 61 | 0.01 |
| 62 | 0.01 |
| 63 | 0.01 |
| 64 | 0.00 |
| 65 | 0.00 |
| 66 | 0.00 |
| 67 | 0.00 |
| 68 | 0.00 |
| 69 | 0.00 |
| 70 | 0.00 |
| 71 | 0.00 |
| 72 | 0.00 |
| 73 | 0.00 |
| 74 | 0.00 |
| 75 | 0.00 |

Inverse Fourier transform is performed on the product of the frequency-domain signal of display brightness data and the preset weight coefficient so that the display brightness data in the frequency domain can be converted back into the display brightness data in the time domain, thereby obtaining the time-domain signal of the processed display brightness data. The time-domain signal is continuous data.

Figure 5:
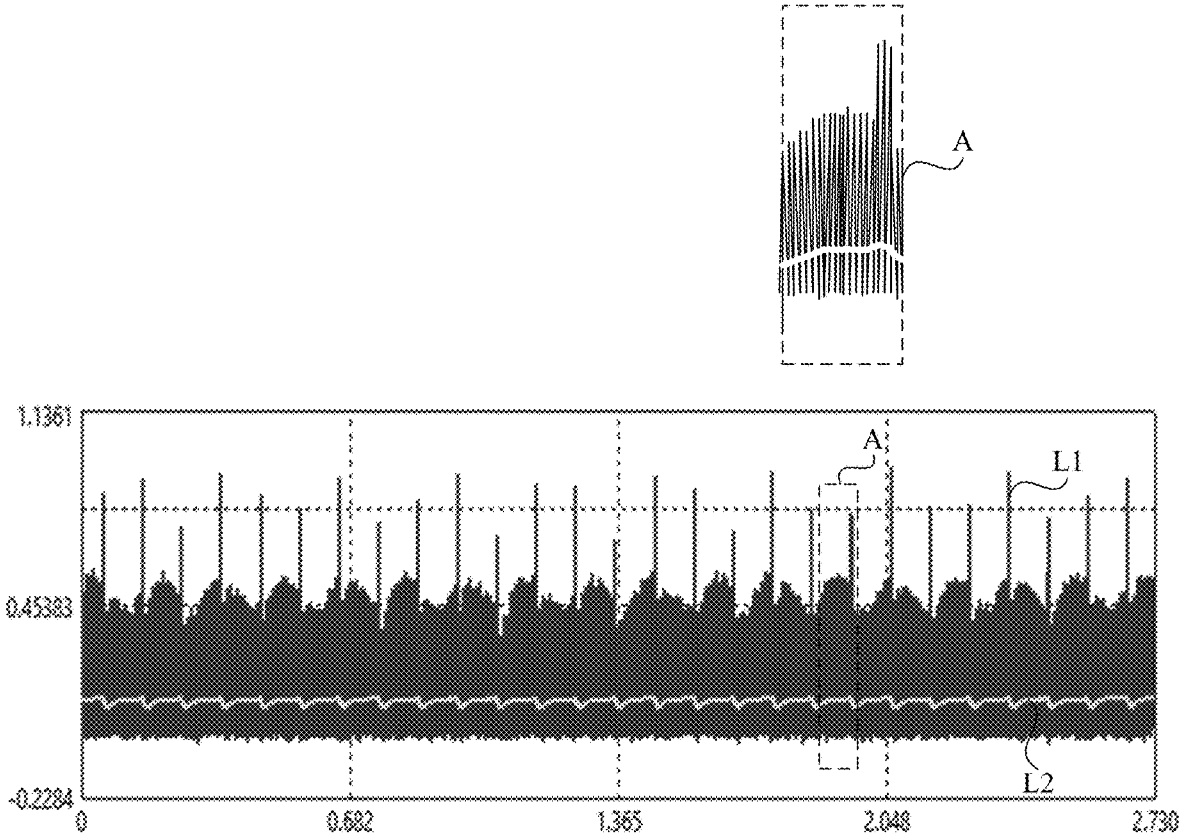
FIG. 5 is a comparison diagram of display brightness data curves before and after processing according to an embodiment of the present disclosure.

FIG. 5 is a comparison diagram of display brightness data curves before and after processing according to an embodiment of the present disclosure. The abscissa denotes time in seconds. The ordinate denotes display brightness data. FIG. 5 schematically shows the original display brightness data curve L1 before processing, an enlarged diagram of region A in the curve L1, and the display brightness data curve L2 obtained by performing Fourier transform on the original display brightness data, multiplying the display brightness data subjected to the Fourier transform by a sensitivity coefficient, and performing inverse Fourier transform. The black curve is L1, and the white curve is L2. As shown in FIG. 5, the waveform of the curve L1 before processing is cluttered, and the waveform of the curve L2 after processing is stable. A series of processing is performed on the original display brightness data so that the cluttered original display brightness data can be converted into the stable display brightness data, thereby reducing the difficulty of subsequent data processing.

In S240, the maximum value, the minimum value, and the comparison reference value of display brightness data in each first time period in the time-domain signal of the multiple display brightness data are determined.

Figure 6:
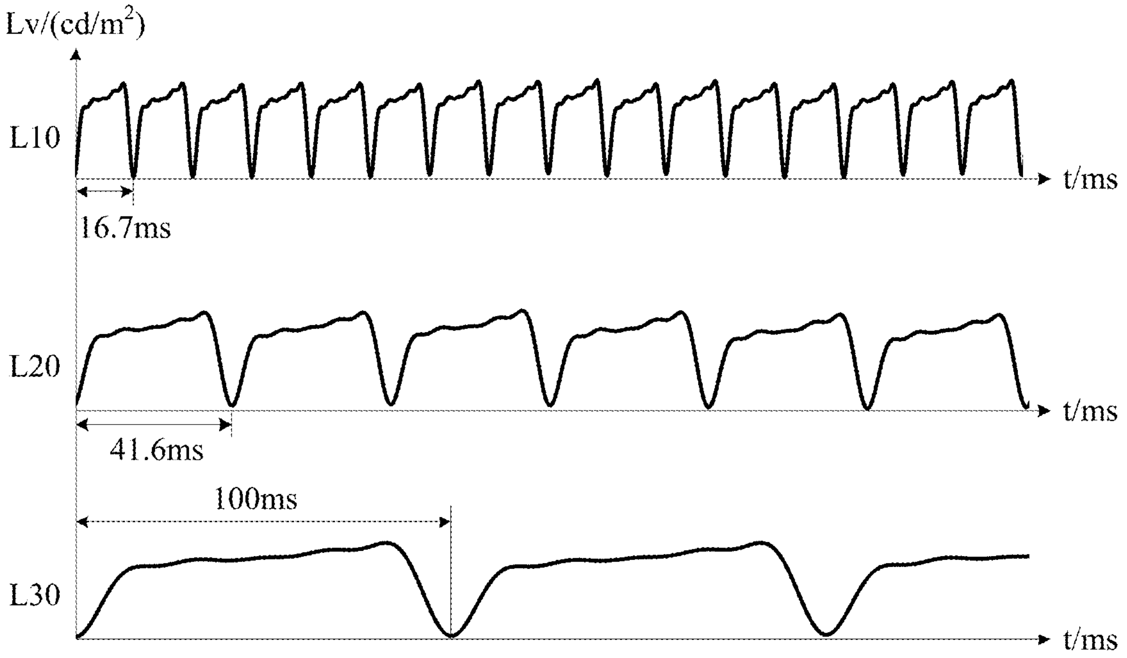
FIG. 6 is a diagram showing curves of display brightness data at different refresh rates according to an embodiment of the present disclosure.

The duration of the first time period is determined according to the visual persistence time of the human eye. The duration of the preset time period is greater than the duration of the first time period. Optionally, the duration of the first time period is the duration of one frame corresponding to a refresh rate of 24 Hz. The duration of one frame corresponding to the refresh rate of 24 Hz is about 41.6 milliseconds. Thus, the duration of the first time period may be set to 41.6 milliseconds. FIG. 6 is a diagram showing curves of display brightness data at different refresh rates according to an embodiment of the present disclosure. As shown in FIG. 6, the abscissa denotes time (t) in milliseconds (ms), and the ordinate denotes display brightness data (Lv), and the unit is $cd/m^2$. The curve L10 is a display brightness data curve at the refresh rate of 60 Hz. The curve L20 is a display brightness data curve at the refresh rate of 24 Hz. The curve L30 is a display brightness data curve at the refresh rate of 10 Hz. When the display panel displays at the refresh rate of 24 Hz, the switching time of a display screen is 41.6 ms, which corresponds to the critical value that the human eye cannot recognize the flicker phenomenon. When the display panel displays at the refresh rate of 60 Hz, the switching time of the display screen is 16.7 ms, and the change in display brightness when the display screen is switched cannot be recognized by the human eye, so that the flicker phenomenon cannot be detected by the human eye. When the display panel displays at the refresh rate of 10 Hz, the switching time of the display screen is 100 ms, and the change in display brightness when the display screen is switched can be recognized by the human eye, and thus the flicker phenomenon can be detected by the human eye. The duration of the first time period is the duration of one frame corresponding to the refresh rate of 24 Hz, which facilitates determining the flicker degree parameter of the display panel in corresponding time according to the recognition limit of the human eye for the flicker phenomenon, so that the evaluation of the flicker degree is closer to the actual observation effect of the human eye.

It is to be noted that in FIG. 6, only the curve L10, the curve L20, and the curve L30 are used as examples to illustrate the switching time of the display screen at different refresh rates to describe the influence of the switching time of the display screen on the flicker degree. The curve shapes of the display brightness data at different refresh rates are not limited in this embodiment.

Figure 7:
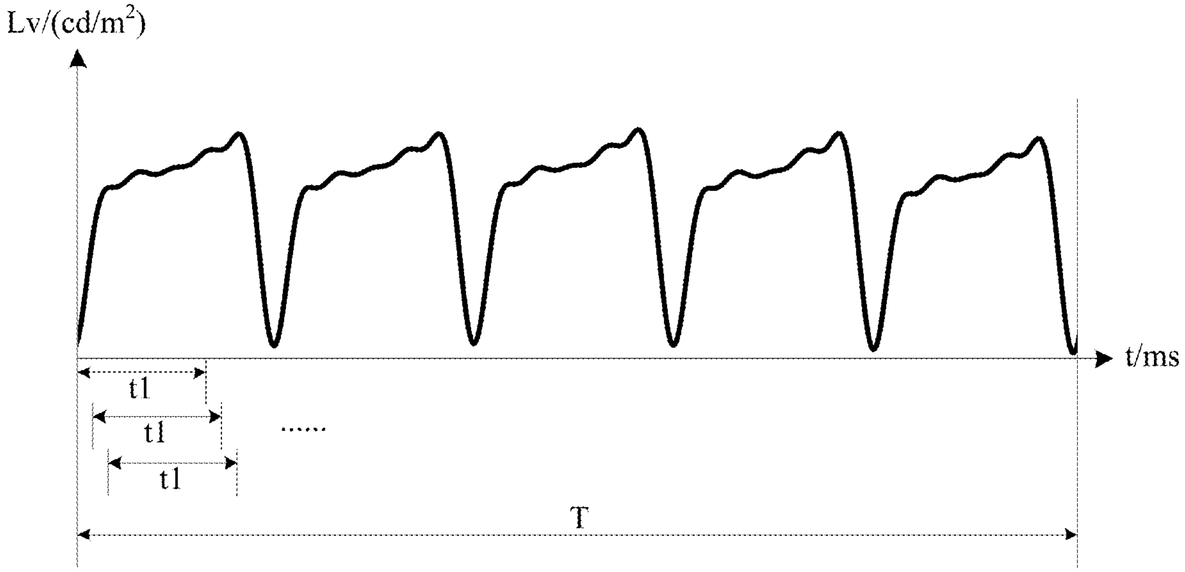
FIG. 7 is a diagram showing a curve of processed display brightness data according to an embodiment of the present disclosure.

FIG. 7 is a diagram showing a curve of processed display brightness data according to an embodiment of the present disclosure. The curve of processed display brightness data may be obtained by performing Fourier transform on display brightness data and then performing inverse Fourier transform on the product of the display brightness data subjected to Fourier transform and a sensitivity coefficient. The abscissa denotes time (t) in milliseconds (ms), and the ordinate denotes display brightness data (Lv) in a unit of $cd/m^2$. For example, referring to FIG. 7, to determine the change rate of the display brightness data of a section of a curve, it is necessary to consider the definition time of the change of the display brightness data (that is, the duration corresponding to the section of the curve), the maximum value and the minimum value of the display brightness data in the section of the curve, and the comparison reference value of the change of the display brightness data. For example, for the change of the display brightness of 1 nit, when 500 nit is used as the comparison reference value, the change of display brightness cannot be recognized by the human eye, and when Snit is used as the comparison reference value, the change of display brightness can be recognized by the human eye. Thus, the definition time of the change of the display brightness data may be set to the duration of one frame corresponding to the refresh rate of 24 Hz. For example, the duration of the first time period t1 is set to 41.6 milliseconds, and the duration of the preset time period T is set to 2.73 seconds. The maximum value, the minimum value, and the comparison reference value of the display brightness data in all the first time periods t1 starting from any time in the preset time period T are determined respectively to calculate the change rate of the display brightness data in each first time period t1. Optionally, the comparison reference value of the change of the display brightness data may be set to be the maximum value or the average value of the display brightness data in the first time period t1. The display brightness data in any numbers of 41.6 ms in the preset time period are analyzed, which facilitates avoiding the problem of distortion of the data analysis result caused by the fact that the preset time period is only divided into different time periods for data analysis and improving the accuracy of the change rate of the display brightness data.

In S250, the change rate of display brightness data in each first time period is determined according to the ratio of the difference between the maximum value and the minimum value of the display brightness data in each first time period to the comparison reference value.

For example, the change rate of the display brightness data in each first time period t1 is calculated as follows:

$$\Delta L/L=(\text{Max}-\text{Min})/M*100\%.$$

ΔL/L denotes the change rate of the display brightness data in each first time period t1. Max denotes the maximum value of the display brightness data in each first time period t1. Min denotes the minimum value of the display brightness data in each first time period t1. M denotes the comparison reference value. The comparison reference value may be the maximum value Max of the display brightness data in each first time period t1 or the average value of the display brightness data in each first time period t1.

In S260, the flicker degree parameter of the display panel is determined according to the change rates of the display brightness data in the multiple first time periods.

Optionally, the flicker degree parameter of the display panel is the maximum value or the average value of the change rates of the display brightness data in the multiple first time periods t1. That is, the flicker degree parameter may be the maximum value in the change rates ΔL/L of the display brightness data in all the first time periods t1 or the average value of the change rates ΔL/L of the display brightness data in all the first time periods t1. Optionally, the flicker degree parameter may also be, in the change rates of the display brightness data in the multiple first time periods t1, the average value of the change rates ΔL/L of display brightness data in a reference time period. For example, when the duration of the preset time period T is 2.73 seconds, the duration of the first time period t1 is 41.6 milliseconds, and the reference time period is the first 2 seconds of the preset time period T. In this case, the average value of the change rates ΔL/L of display brightness data in all first time periods t1 in the first 2 seconds of the preset time period T may be used as the flicker degree parameter. The reference time period may be set to a time period that best reflects the flicker degree of the display panel according to requirements to improve the accuracy of the flicker degree parameter.

In S270, whether to debug the display panel is determined according to the flicker degree parameter.

The display panel may be debugged in a variety of methods to alleviate the flicker degree of the display panel. Reference may be made to any one of the first to third flicker alleviation methods in the preceding embodiments, and the details are not repeated here.

On the basis of the preceding embodiments, optionally, before step S240, the flicker debugging method for a display panel also includes removing data in a second time period in the time-domain signal of the multiple display brightness data. The second time period is at least one of the start stage or the end stage in the preset time period. The duration of the second time period is less than half of the duration of the preset time period. The difference between the duration of the preset time period and the duration twice the duration of the second time period is greater than the duration of the first time period.

For example, when the duration of the preset time period is 2.73 seconds and the duration of the first time period is 41.6 milliseconds, the duration of the second time period may be 0.1 seconds. After step S230 is completed, due to the fluctuation in the display brightness data subjected to Fourier transform and inverse Fourier transform, before step S240 is performed, the signal in the first 0.1 seconds and the signal in the last 0.1 seconds can be removed in the time-domain signal of display brightness data of 2.73 seconds. Then, the steps S240 to S270 are performed. In this manner, it is helpful to eliminate abnormal fluctuation data, thereby improving the accuracy of the flicker degree parameter.

Figure 8:
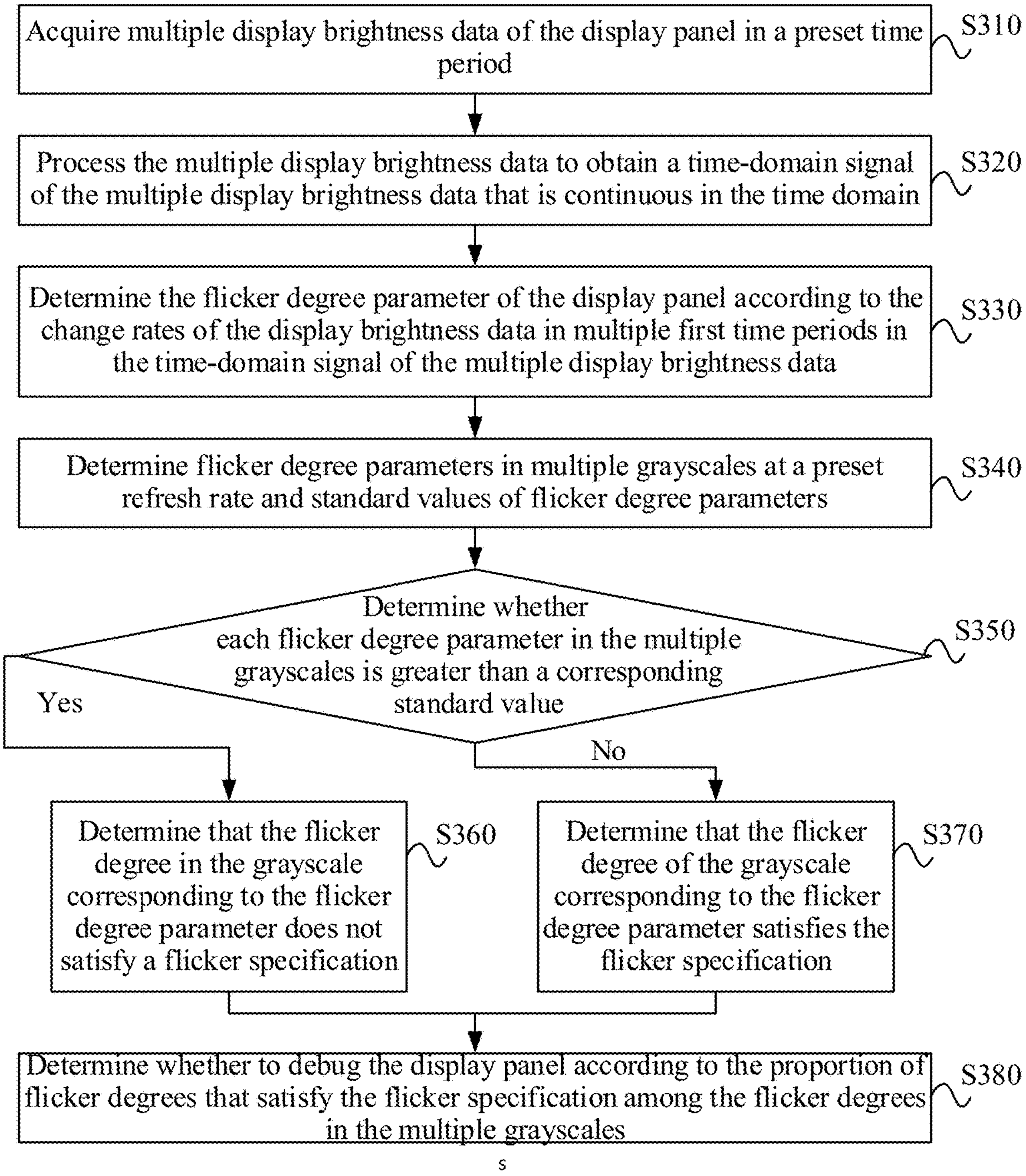
FIG. 8 is a flowchart of another flicker debugging method for a display panel according to an embodiment of the present disclosure.

FIG. 8 is a flowchart of another flicker debugging method for a display panel according to an embodiment of the present disclosure. On the basis of multiple preceding embodiments, the flicker debugging method for a display panel is described in this embodiment. As shown in FIG. 8, the method includes the steps below.

In S310, multiple display brightness data of the display panel in a preset time period is acquired.

Optionally, the display panel may be controlled to display in different grayscales at the preset refresh rate to acquire multiple display brightness data in the preset time period corresponding to the multiple grayscales at the preset refresh rate. For example, when the preset refresh rate is 10 Hz, it is possible to control the display panel to display at a refresh rate of 10 Hz in grayscales of 0 to 255 respectively, and multiple display brightness data in the preset time period corresponding to multiple grayscales are acquired.

In S320, the multiple display brightness data is processed to obtain a time-domain signal of the multiple display brightness data that is continuous in the time domain.

In S330, the flicker degree parameter of the display panel is determined according to the change rates of display brightness data in multiple first time periods in the time-domain signal of the multiple display brightness data.

The duration of the first time period is determined according to the visual persistence time of the human eye. The duration of the preset time period is greater than the duration of the first time period.

Fourier transform is performed on the display brightness data in the preset time period corresponding to each grayscale, and then inverse Fourier transform is performed on the product of the display brightness data subjected to Fourier transform and a sensitivity coefficient, thereby obtaining a time-domain signal of the display brightness data corresponding to each grayscale after the processing. The change rates of display brightness data in multiple first time periods in the time-domain signal of the display brightness data corresponding to each grayscale are determined so that the flicker degree parameter corresponding to each grayscale is calculated according to the change rates of the display brightness data in the multiple first time periods.

In S340, flicker degree parameters in multiple grayscales at the preset refresh rate and standard values of the flicker degree parameters are determined.

The standard value of the flicker degree parameter may be set according to requirements. For example, the standard value of the flicker degree parameter is a flicker degree parameter value corresponding to the flicker degree unrecognizable by the human eye. The standard value may be a flicker degree parameter value when the flicker of the display panel cannot be observed by the human eye on the display panel. Each grayscale may have a corresponding standard value of the flicker degree parameter. The standard values of the flicker degree parameters corresponding to the multiple grayscales may be the same or different.

In S350, whether the flicker degree parameters in multiple grayscales are greater than corresponding standard values is determined.

If a flicker degree parameter is greater than a corresponding standard value, step S360 is performed. If the flicker degree parameter is less than or equal to the corresponding standard value, step S370 is performed.

In S360, it is determined that the flicker degree in the grayscale corresponding to the flicker degree parameter does not satisfy a flicker specification.

In S370, it is determined that the flicker degree in the grayscale corresponding to the flicker degree parameter satisfies the flicker specification.

The flicker specification is a standard for the flicker degree unrecognizable by the human eye. For example, in combination with the technical solutions of various embodiments of the present disclosure, the flicker degree parameters corresponding to multiple grayscales when the display panel displays in different grayscales at the preset refresh rate may be actually measured. For example, the flicker degree parameter when the display panel displays in each of grayscales of 1 to 255 at a refresh rate of 10 Hz is measured. The flicker degree parameters may be expressed as a percentage. The greater the flicker degree parameter is, the more severe the flicker degree of the display panel is. The smaller the flicker degree parameter is, the slighter the flicker degree of the display panel is. According to the actual measurement results, it can be known that from a grayscale of 1 to a grayscale of 255, the flicker degree parameter of the display panel becomes smaller and smaller, and the flicker degree of the display panel becomes slighter and slighter. When the standard values of the flicker degree parameters corresponding to all grayscales are all 5%, the flicker degree parameters corresponding to grayscales of 1 to 255 may be compared with 5% one by one. If the flicker degree parameter corresponding to a grayscale is greater than 5%, it may be determined that the flicker degree in the grayscale can be recognized by the human eye, and does not satisfy the flicker specification. If the flicker degree parameter corresponding to a grayscale is less than or equal to 5%, it may be determined that the flicker degree in the grayscale cannot be recognized by the human eye, and satisfies the flicker specification.

In S380, whether to debug the display panel is determined according to a proportion of flicker degrees that satisfy the flicker specification among flicker degrees in the plurality of grayscales.

It may be determined whether the flicker degrees in the multiple grayscales at the preset refresh rate satisfy the flicker specification, and the condition that the flicker degree in each grayscale at the preset refresh rate satisfies the flicker specification is set. For example, if the flicker degrees in all grayscales at the preset refresh rate satisfy the flicker specification, it is determined that the flicker degree at the refresh rate satisfies the flicker specification. Alternatively, if the flicker degrees in at least part of grayscales at the preset refresh rate satisfy the flicker specification, it is determined that the flicker degree of the preset refresh rate satisfies the flicker specification.

Optionally, step S380 may include determining whether the flicker degree in each grayscale at the preset refresh rate satisfies the flicker specification. When the flicker degree in any grayscale at the preset refresh rate does not satisfy the flicker specification, it is determined that the flicker degree of the preset refresh rate does not satisfy the flicker specification, and the display panel is debugged. When the flicker degree in each grayscale at the preset refresh rate satisfies the flicker specification, it is determined that the flicker degree of the preset refresh rate satisfies the flicker specification, and the display panel does not need to be debugged.

Figure 9:
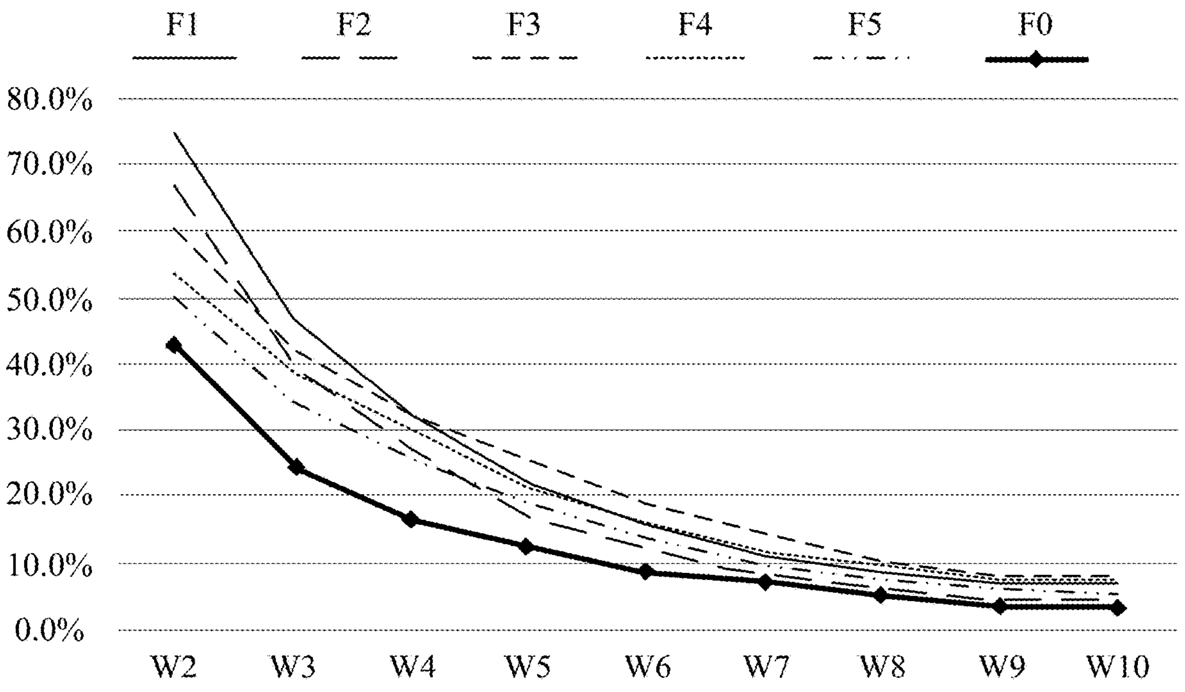
FIG. 9 is a comparison diagram of the relationship curves between a grayscale and a flicker degree parameter according to an embodiment of the present disclosure.

FIG. 9 is a comparison diagram of the relationship curves of a grayscale and a flicker degree parameter according to an embodiment of the present disclosure. In combination with the methods of various embodiments of the present disclosure, five different display panels may be tested to obtain flicker degree parameters corresponding to multiple grayscales when each display panel displays in different grayscales at a refresh rate of 10 Hz. Curves F1 to F5 are relationship curves of the grayscale and the flicker degree parameter corresponding to five different display panels. The curve F0 is the relationship curve of a grayscale and a standard value of the flicker degree parameter at the refresh rate of 10 Hz. The curve F0 schematically shows the standard values of the flicker degree parameters corresponding to multiple grayscales.

For example, referring to FIG. 9, if the flicker degree parameter in each grayscale at the refresh rate of 10 Hz is less than or equal to the standard value of the flicker degree parameter in the corresponding grayscale in the curve F0, it may be determined that the flicker of the display panel at the refresh rate of 10 Hz cannot be recognized by the human eye, thereby satisfying the flicker specification without debugging. The flicker degree parameters in the multiple grayscales in the curves F1 to F5 are all greater than the standard value of the flicker degree parameter in the corresponding grayscale in the curve F0. Thus, the flicker of the five display panels at the refresh rate of 10 Hz can be recognized by the human eye, and the flicker specification is not satisfied. For this reason, it is necessary to debug the five display panels to alleviate the flicker degree at the refresh rate of 10 Hz. There are a variety of methods to alleviate the flicker degree of the display panel. Reference may be made to any one of the first to third flicker alleviation methods in the preceding embodiments, and the details are not repeated here.

In the technical solutions of this embodiment, the flicker degree parameters when the display panel displays in different grayscales at the preset refresh rate are determined, and the flicker degree parameters in multiple grayscales are compared with the standard values of the flicker degree parameters to determine whether the flicker degrees in the multiple grayscales satisfy the flicker specification. Thus, whether the flicker degree of the display panel at the preset refresh rate satisfies the flicker specification is determined according to whether the flickering degrees in multiple grayscales satisfy the flicker specification, and then the display panel is debugged accordingly, which facilitates alleviating the flicker phenomenon of the display panel at the preset refresh rate.

Figure 10:
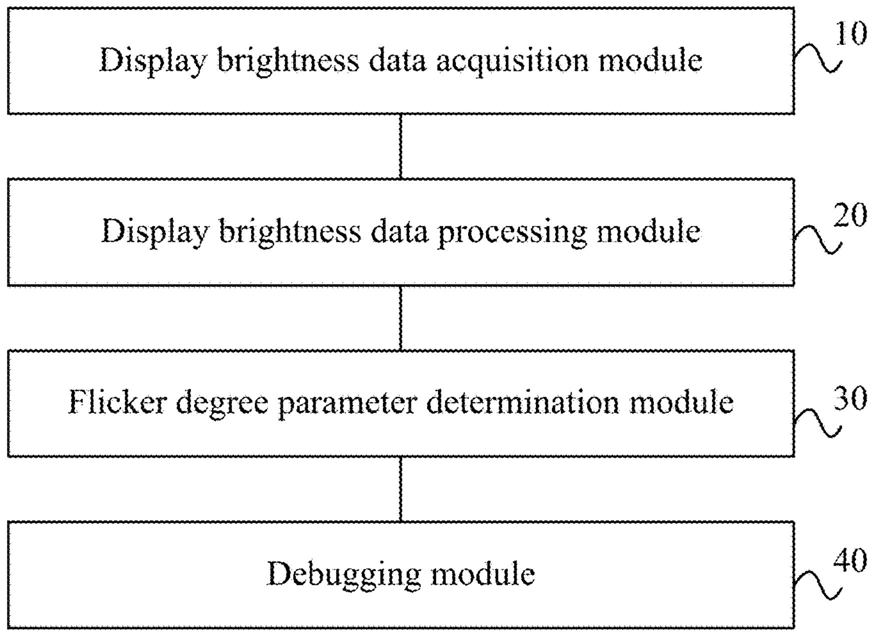
FIG. 10 is a diagram illustrating the structure of a flicker debugging device for a display panel according to an embodiment of the present disclosure.

FIG. 10 is a diagram illustrating the structure of a flicker debugging device for a display panel according to an embodiment of the present disclosure. This embodiment is applicable to the case where the flicker degree parameter of the display panel is determined to alleviate the flicker phenomenon. The flicker debugging device for a display panel provided in this embodiment of the present disclosure can execute the flicker debugging method for a display panel provided in any embodiment of the present disclosure and has functional modules corresponding to the method executed. As shown in FIG. 10, the flicker debugging device for a display panel includes a display brightness data acquisition module 10, a display brightness data processing module 20, a flicker degree parameter determination module 30, and a debugging module 40.

The display brightness data acquisition module 10 is configured to acquire the multiple display brightness data of the display panel in the preset time period. The display brightness data processing module 20 is configured to process the multiple display brightness data to obtain the time-domain signal of the multiple display brightness data that is continuous in the time domain. The flicker degree parameter determination module 30 is configured to determine the flicker degree parameter of the display panel according to the change rates of the display brightness data in the multiple first time periods in the time-domain signal of the multiple display brightness data. The duration of the first time period is determined according to the visual persistence time of the human eye. The duration of the preset time period is greater than the duration of the first time period. The debugging module 40 is configured to determine whether to debug the display panel according to the flicker degree parameter.

The flicker debugging device for a display panel provided in this embodiment of the present disclosure can execute the flicker debugging method for a display panel provided in any embodiment of the present disclosure and has functional modules corresponding to the method executed. The details are not repeated.

Figure 11:
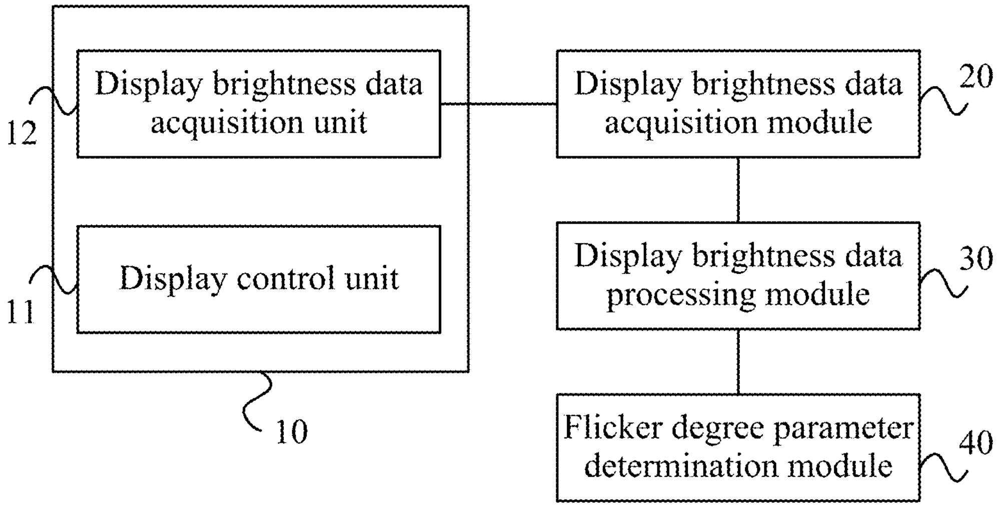
FIG. 11 is a diagram illustrating the structure of another flicker debugging device for a display panel according to an embodiment of the present disclosure.

FIG. 11 is a diagram illustrating the structure of another flicker debugging device for a display panel according to an embodiment of the present disclosure. As shown in FIG. 11, optionally, on the basis of the preceding embodiments, the display brightness data acquisition module 10 includes a display control unit 11 and a display brightness data acquisition unit 12. The display control unit 11 is electrically connected to the display panel and configured to control the display panel to display. The display brightness data acquisition unit 12 is electrically connected to the display brightness data processing module 20 and configured to acquire the multiple display brightness data of the display panel in the preset time period and transmit the multiple display brightness data to the display brightness data processing module 20.

Figure 12:
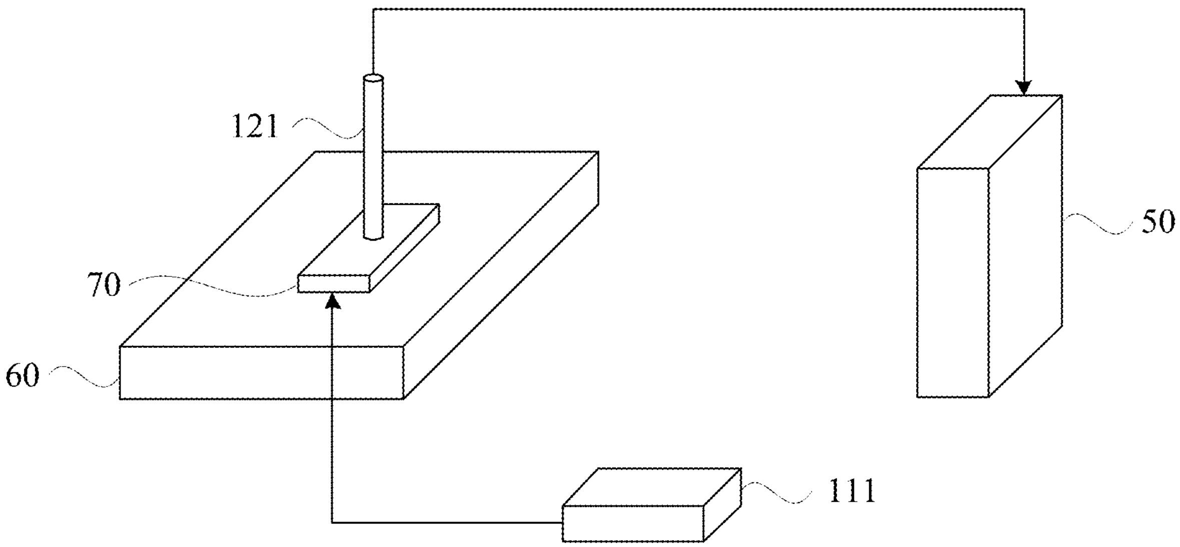
FIG. 12 is a diagram illustrating the structure of another flicker debugging device for a display panel according to an embodiment of the present disclosure.

FIG. 12 is a view illustrating the structure of another flicker debugging device for a display panel according to an embodiment of the present disclosure. In conjunction with FIGS. 11 and 12, optionally, on the basis of multiple preceding embodiments, the display control unit includes a signal generator 111. The display brightness data acquisition unit 12 includes a colorimeter 121. The display brightness data processing module 20 and the flicker degree parameter determination module 30 are configured in a computer 50.

The flicker debugging device for a display panel may also include a product carrier 60. When the flicker degree parameter of the display panel is determined, the display panel 70 may be placed flat on the product stage 60. The display panel 70 is controlled by the signal generator 111 to display in the target grayscale at the preset refresh rate. The colorimeter 121 is placed in the middle position directly above the display side of the display panel 70 to acquire multiple display brightness data of the display panel 70 in the preset time period by the colorimeter 121. The multiple display brightness data is transmitted to the display brightness data processing module 20 and the flicker degree parameter determination module 30 in the computer 50. The display brightness data processing module 20 performs Fourier transform on the multiple display brightness data to obtain the frequency-domain signal of the multiple display brightness data and performs inverse Fourier transform on the product of the frequency-domain signal of the multiple display brightness data and the preset weight coefficient to obtain the time-domain signal of the multiple display brightness data in the preset time period. The flicker degree parameter determination module 30 determines the maximum value, the minimum value, and the comparison reference value of the display brightness data in the multiple first time periods in the time-domain signal of the multiple display brightness data, determines the change rate of the display brightness data in each time period according to the ratio of the difference between the maximum value and the minimum value of the display brightness data in each first time period to the comparison reference value, and determines the flicker degree parameter of the display panel according to the change rates of the display brightness data in the multiple first time periods. The computer 50 may also debug the display panel according to the flicker level parameter to alleviate the flicker degree of the display panel.

What is claimed is:

1. A flicker debugging method for a display panel, comprising:

acquiring a plurality of display brightness data of the display panel in a preset time period;

processing the plurality of display brightness data to obtain a time-domain signal of the plurality of display brightness data, the time-domain signal being continuous in a time domain;

determining a flicker degree parameter of the display panel according to change rates of display brightness data in a plurality of first time periods in the time-domain signal of the plurality of display brightness data, wherein duration of each of the plurality of first time periods is determined according to visual persistence time of a human eye, and duration of the preset time period is greater than the duration of the each of the plurality of first time periods; and determining whether to debug the display panel according to the flicker degree parameter.

2. The flicker debugging method for a display panel according to claim 1, wherein processing the plurality of display brightness data to obtain the time-domain signal of the plurality of display brightness data, the time-domain signal being continuous in the time domain, comprises:

performing Fourier transform on the plurality of display brightness data to obtain a frequency-domain signal of the plurality of display brightness data; and performing inverse Fourier transform on a product of the frequency-domain signal of the plurality of display brightness data and a preset weight coefficient to obtain the time-domain signal of the plurality of display brightness data in the preset time period, wherein the preset weight coefficient is a sensitivity coefficient of the human eye to a flicker, and sensitivity coefficients corresponding to different refresh rate ranges are different.

3. The flicker debugging method for a display panel according to claim 2, wherein in a case where the display panel is determined to be debugged according to the flicker degree parameter, a debugging method of the display panel comprises at least one of the following: adjusting a drive timing of a pixel circuit, adjusting a voltage value of an initialization signal, or adjusting a power voltage.

4. The flicker debugging method for a display panel according to claim 1, before determining the flicker degree parameter of the display panel according to the change rates of the display brightness data in the plurality of first time periods in the time-domain signal of the plurality of display brightness data, further comprising:

removing data in a second time period in the time-domain signal of the plurality of display brightness data, wherein the second time period is at least one of a start stage or an end stage in the preset time period, duration of the second time period is less than half of the duration of the preset time period, and a difference between the duration of the preset time period and a duration twice the duration of the second time period is greater than the duration of the each of the plurality of first time periods.

5. The flicker debugging method for a display panel according to claim 4, wherein in a case where the display panel is determined to be debugged according to the flicker degree parameter, a debugging method of the display panel comprises at least one of the following: adjusting a drive timing of a pixel circuit, adjusting a voltage value of an initialization signal, or adjusting a power voltage.

6. The flicker debugging method for a display panel according to claim 1, wherein the duration of the each of the plurality of first time periods is duration of one frame corresponding to a refresh rate of 24 Hz.

7. The flicker debugging method for a display panel according to claim 1, wherein determining the flicker degree parameter of the display panel according to the change rates of the display brightness data in the plurality of first time periods in the time-domain signal of the plurality of display brightness data comprises:

determining a maximum value, a minimum value, and a comparison reference value of display brightness data in the each of the plurality of first time periods in the time-domain signal of the plurality of display brightness data, wherein the comparison reference value comprises the maximum value or an average value of the display brightness data in the each of the plurality of first time periods;

determining a change rate of the display brightness data in the each of the plurality of first time periods according to a ratio of a difference between the maximum value and the minimum value of the display brightness data to the comparison reference value in the each of the plurality of first time periods; and determining the flicker degree parameter of the display panel according to the change rates of display brightness data in the plurality of first time periods.

8. The flicker debugging method for a display panel according to claim 7, wherein the change rate of the display brightness data in the each of the plurality of first time periods is calculated as follows:

$$\Delta L/L=(\mathrm{Max}-\mathrm{Min})/M*100\%,$$

wherein ΔL/L denotes the change rate of the display brightness data in the each of the plurality of first time periods, Max denotes the maximum value of the display brightness data in the each of the plurality of first time periods, Min denotes the minimum value of the display brightness data in the each of the plurality of first time periods, and M denotes the comparison reference value.

9. The flicker debugging method for a display panel according to claim 7, wherein the flicker degree parameter of the display panel is a maximum value or an average value among the change rates of the display brightness data in the plurality of first time periods.

10. The flicker debugging method for a display panel according to claim 1, wherein the plurality of display brightness data comprises display brightness data in the preset time period corresponding to a plurality of grayscales when the display panel displays in different grayscales at a preset refresh rate; and determining whether to debug the display panel according to the flicker degree parameter comprises:

determining a flicker degree parameter in each of the plurality of grayscales at the preset refresh rate and a standard value of the flicker degree parameter;

when the flicker degree parameter is greater than the standard value of the flicker degree parameter, determining that a flicker degree in the each of the plurality of grayscales corresponding to the flicker degree parameter does not satisfy a flicker specification;

when the flicker degree parameter is less than or equal to the standard value of the flicker degree parameter, determining that the flicker degree of the each of the plurality of grayscales corresponding to the flicker degree parameter satisfies the flicker specification; and determining whether to debug the display panel according to a proportion of flicker degrees satisfying the flicker specification among flicker degrees in the plurality of grayscales.

11. The flicker debugging method for a display panel according to claim 10, wherein the standard value of the flicker degree parameter is a flicker degree parameter value corresponding to a flicker degree unrecognizable by the human eye, and the each of the plurality of grayscales has the corresponding standard value of the flicker degree parameter.

12. The flicker debugging method for a display panel according to claim 10, wherein determining whether to debug the display panel according to the proportion of the flicker degrees satisfying the flicker specification among the flicker degrees in the plurality of grayscales comprises:

in a case where a flicker degree in any grayscale at the preset refresh rate does not satisfy the flicker specification, determining that a flicker degree at the preset refresh rate does not satisfy the flicker specification and debugging the display panel; and in a case where a flicker degree in each grayscale at the preset refresh rate satisfies the flicker specification, determining that a flicker degree at the preset refresh rate satisfies the flicker specification.

13. The flicker debugging method for a display panel according to claim 1, wherein in a case where the display panel is determined to be debugged according to the flicker degree parameter, a debugging method of the display panel comprises at least one of the following: adjusting a drive timing of a pixel circuit, adjusting a voltage value of an initialization signal, or adjusting a power voltage.

14. The flicker debugging method for a display panel according to claim 13, adjusting the drive timing of the pixel circuit comprises: prolonging data write time of one frame of display screen or adding a compensation stage or a precharging stage to the drive timing of the pixel circuit.

15. The flicker debugging method for a display panel according to claim 13, wherein the initialization signal is a signal for initializing a gate of a drive transistor; and adjusting the voltage value of the initialization signal comprises: adjusting a voltage difference between the gate of the drive transistor of the pixel circuit and an initialization signal input terminal of the pixel circuit.

16. The flicker debugging method for a display panel according to claim 13, wherein the power voltage is a power voltage electrically connected to an anode of a light emission device in a light emission stage.

17. A flicker debugging device for a display panel, comprising:

a display brightness data acquisition module configured to acquire a plurality of display brightness data of the display panel in a preset time period;

a display brightness data processing module configured to process the plurality of display brightness data to obtain a time-domain signal of the plurality of display brightness data, the time-domain signal being continuous in a time domain;

a flicker degree parameter determination module configured to determine a flicker degree parameter of the display panel according to change rates of display brightness data in a plurality of first time periods in the time-domain signal of the plurality of display brightness data, wherein duration of each of the plurality of first time periods is determined according to visual persistence time of a human eye, and duration of the preset time period is greater than the duration of the each of the plurality of first time periods; and a debugging module configured to determine whether to debug the display panel according to the flicker degree parameter.

18. The flicker debugging device for a display panel according to claim 17, wherein the display brightness data acquisition module comprises:

a display control unit electrically connected to the display panel and configured to control the display panel to display; and a display brightness data acquisition unit electrically connected to the display brightness data processing module and configured to acquire the plurality of display brightness data of the display panel in the preset time period and transmit the plurality of display brightness data to the display brightness data processing module.

19. The flicker debugging device for a display panel according to claim 18, wherein the display control unit comprises a pattern generator, the display brightness data acquisition unit comprises a colorimeter, and the display brightness data processing module and the flicker degree parameter determination module are configured in a computer.

* * * * *